United States Patent [19]

Volk

[11] Patent Number: 4,771,509

[45] Date of Patent: Sep. 20, 1988

[54] MULTIPLE STRAP POULTRY LEG RETAINER

[75] Inventor: Anthony J. Volk, Turlock, Calif.

[73] Assignee: Volk Development Company, Turlock, Calif.

[21] Appl. No.: 114,729

[22] Filed: Oct. 30, 1987

Related U.S. Application Data

[63] Continuation-in-part of Ser. No. 41,975, Apr. 24, 1987.

[51] Int. Cl.⁴ .............................................. A22C 21/00
[52] U.S. Cl. ........................................... 17/1 S; 17/11
[58] Field of Search ..................................... 17/1 S, 11

[56] References Cited

U.S. PATENT DOCUMENTS 4,051,573 10/1977 Volk ...................................... 17/1 S
4,615,075 10/1986 Volk ...................................... 17/1 S Primary Examiner—Willie G. Abercrombie
Attorney, Agent, or Firm—Alvin E. Hendricson

[57] ABSTRACT

A unitary limitedly flexible retainer for the legs of eviscerated poultry has multiple straps for engaging the creases in the poultry hocks together with an improved lower strap, together with a locking tab provides for positive locking of poultry legs of varying sizes and lengths for trussing poultry.

8 Claims, 1 Drawing Sheet

U.S. Patent  Sep. 20, 1988  4,771,509
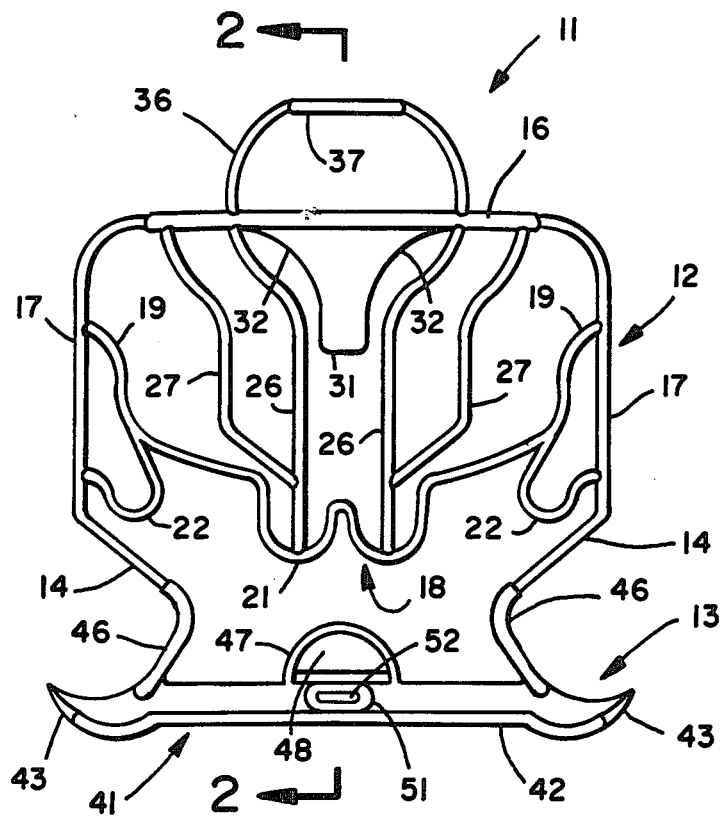
FIG _ 1
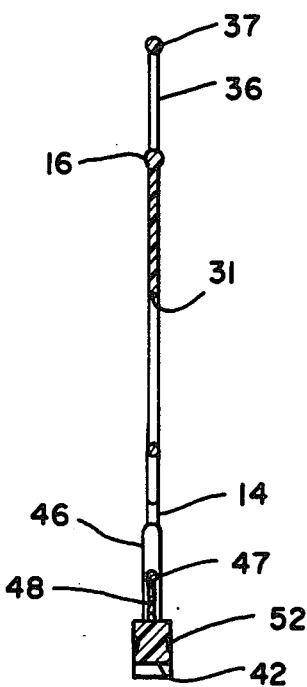
FIG _ 2

MULTIPLE STRAP POULTRY LEG RETAINER

The present application is a continuation-in-part of my prior copending patent application Ser. No. 07/041,975 entitled "POSITIVE LOCKING RETAINER" and filed in the U.S. Patent Office on Apr. 24, 1987.

BACKGROUND OF INVENTION

A widely employed poultry trussing device is shown in U.S. Pat. No. 3,112,515 and numerous improvements thereof have been patented, as shown, for example, in my U.S. Pat. No. 4,615,075. Aside from ease of attachment and assurance of poultry leg retention, it is important for devices of this type to accommodate a relatively wide range of poultry sizes. Thus turkeys, for example, may vary in size from about twelve pounds to twenty some odd pounds and more, so that the size and length of the legs to be retained or trussed are quite different. Additionally, the processing of poultry, particularly for freezing, often includes steps which may tend to unseat trussed legs.

There is shown and described in my copending U.S. patent a Application Ser. No. 041,975 an improved retainer particularly directed to positively locking of poultry legs in trussed position and the present invention provides a further improvement thereover. Specifically, in the attachment of a trussing device it has been found that, under certain circumstances and with certain sizes of poultry, portions of the device may be prematurely bowed outward or may slip from the hocks of legs being trussed. In addition, processing of quite large poultry may possibly result in failure to properly engage the creases of the hocks of the legs and the lower retainer strap may fail to reach entirely across the underside of the hocks.

SUMMARY OF INVENTION

The present invention provides particular improvement of the retainer of my above-noted patent application to the end of more readily and securely engaging the legs of poultry of substantially different sizes. Although the present invention is applicable to the trussing of poultry in general, the following description and application is referenced to the trussing of turkeys as a primary example of the invention. Also, reference is made to my above-noted patent application for a discussion of the application of a trussing device of this type to turkey legs and the device improved upon by the present invention.

As compared to my above-noted retainer, the present invention provides an expansible lower retaining strap adapted to fit under and behind the hocks of the legs together with lower side loops or connections for accommodating a substantial size range of legs and for holding such strap against possible upward movement or outward bowing during application and providing more positive engagement with the underside of the legs. The present invention also provides multiple straps for engaging the crease of each hock of the turkey legs for ensuring the ultimate location of at least one strap in the crease of each hock during attachment of the retainer even though the hocks and legs may vary substantially in size. This then provides for fully trussing engagement of one size of the device hereof with many sizes of turkeys.

There is also provided by the present invention an improved tab locking element for the retainer hereof which is not only designed to fit behind the hocks of turkey legs but which also has side membranes or configurations for forceable engagement with the legs through skin that may remain thereon to prevent slippage of the retainer after hocks are inserted therein or the devices is applied to the hocks. Such structure also prevents relative vertical movement of the retained hocks to that they are constrained to remain in the same plane for maximum trussing action and preferred exterior trussed configuration.

The present invention thus provides specific improvements in poultry leg trussing for expanding the applicability thereof.

BRIEF DESCRIPTION OF DRAWINGS

The present invention is illustrated in the accompanying drawings; wherein:

FIG. 1 is a front elevational view of a retainer in accordance with the present invention;

FIG. 2 is a central sectional view taken in the plane 2—2 of FIG. 1;

DESCRIPTION OF PREFERRED EMBODIMENT

A preferred embodiment of the present invention is illustrated in FIGS. 1 and 2 of the drawings, and referring thereto it will be seen that the retainer 11 includes an upper bridle portion 12 and a lower anchor or beam portion 13 connected by extensible legs 14. Such portions generally correspond to like named portions of my above-noted co-pending patent application. It is furthermore noted that the retainer hereof is preferably formed as a single integral unit of nylon or the like which may be readily produced by standard plastic injection molding techniques. The material of the retainer is limitedly resiliently flexible which returns to original configuration after removal of deflection forces. The material also is impervious to chemicals with which it may come into contact during use and which is not affected by temperature to which it may be subjected during use.

Considering first the bridle 12 of the retainer, it is noted that same includes an upper horizontal bar or strap 16 with vertical end strips 17 curving downwardly from the ends of the top strap 16 and merging into the upper ends of the legs 14. A lower strap 18 extends between the end or outer strips 17 beneath the upper strap 16 and this lower strap 18 convoluted for substantial resilient extension in length. As shown, the lower strap 18 has the outer ends or portions 19 thereof merging into the outer vertical strips 17 somewhat below the upper strap 16 with such outer portions curving downwardly and inwardly of the retainer to upper ends of a double convoluted central portion 21 of the lower strap 18. These upper portions 19 preferably curve inwardly and downwardly and then inwardly to the upper ends of the double concave portion 21, with it being noted that portion 21 has the double curvature concave with respect to the upper strap 16. It will be seen that this configuration of the lower strap 18 provides for substantial extension of the length thereof by resilient deformation and the purpose of this feature is further discussed below.

There is additionally provided by the present invention means for limiting the deformation of the lower strap 18 perpendicularly out of the plane of FIG. 1 and such means include a pair of side straps 22 and extending downwardly from about the center of the upper portions 19 of the lower strap 18 in loops terminating in merging relationship with the side strips 17 immediately above the legs 14. These retaining means or straps 22 lock the upper portions of the lower strap 18 to the lower portions of the outer side strips 17 to prevent the lower strap from being pivoted outwardly of the plain of FIG. 1 beyond the extensible length of the looped straps 22.

There are also provided as portions of the bridle 12 a plurality of central upright "crease" straps between the upper strap 16 and lower strap 18. More particularly, a pair of generally vertical or upright straps 26 extend from the upper strap 16 into merging relationship with the lower strap 18 at the bottom of the concave portions of the double concave section 21 of the lower strap 18. These center or crease straps 26 include an upper curved portion and a lower relatively straight portion. Furthermore, there is herein provide a second pair of "crease" straps extending downwardly from the outer ends of the upper strap 16 into merging relation with the central straps 26 adjacent to the lower ends of the latter. These secondary straps 27 have the upper portions thereof generally curved inwardly and thence downwardly to extend generally parallel with the inner straps 26 and the lower portions of the secondary straps then are curved inwardly into merging relationship with the inner straps 26 at the outer sides thereof in general alignment with the upper ends of the double convoluted central portion 21 of the lower strap 18. It will be seen that these secondary straps 27 may be resiliently extended in length and, as illustrated, such secondary straps may be generally parallel with the inner straps 26 in disposition laterally outwardly therefrom over the most of the length of the straps. The provision of the two pairs of straps 26 and 27 serve to extend the applicability of the present invention as further discussed below.

The bridle portion 12 of the present invention additionally includes a substantially rigid central tab 31 depending from the upper strap 16 between the central vertical straps 26 for a distance slightly less than half of the distance between upper strap and lower straps at the center of the retainer. This depending tab 31 is adapted to fit behind the hocks of poultry legs being trussed by the present retainer so as to act as a lever an outward pressure on the retained hocks to ensure an even truss of the latter. The pending tab 31 has outwardly flairing sides upwardly of the tab which may, as illustrated, comprise edges that curve inwardly from the base of the tab downwardly to a flat tab bottom. These curved sides or "membranes" 32 engage and dig into skin behind the turkey hocks for positive gripping of the legs behind the hocks so as to prevent slippage of the retainer after the hocks have been inserted in the retainer hereof. These curved portions or sides 32 of the tab 31 also prevent vertical movement of the hocks after they have been inserted in the retainer so as to assist in keeping the hocks aligned after they are retained by the present invention.

There is also preferably provided by the present invention an upper semicircular ring 36 extending upwardly from the top strap 16 to form a finger hold for gripping the retainer hereof during application and removal of the retainer from the legs of poultry. This semicircular ring 36 preferably includes a stiffened portion or bar 37 extending across the top thereof in order to prevent undue deformation of the ring during use in drawing the retainer upwardly for resilient extension of the retainer during application and removal of the retainer.

The lower portion or anchor means 13 of the present device may be the same as that illustrated and described in my above-noted copending patent application, although it is possible to employ hooked legs as shown and described in my prior patents. Briefly, it will be seen that the illustrated embodiment of the present invention includes a substantially rigid transverse beam 41 having a stiffening rib 42 along the bottom thereof with upwardly curved ends 43 terminating in points for insertion in the kidney holes of the backbone of a turkey and retention of the locking means therein. The legs 14 are shown to be inclined inwardly from the lower ends of the outer vertical strips 17 and thence to extend outwardly into merging relationship with the beam 41 to form knees or the like 46 whereby the legs 14 may be resiliently extended. Preferably the lower portion of the legs 14 are strengthened as by being formed of a larger diameter to improve the locking action of the anchor 13.

There may be also provided a small loop 47 atop the center of the lower beam 41 to assist in gripping the beam for movement thereof, and this loop may have a membrane 48 substantially filling same to assist in moving the beam perpendicularly to the plain of FIG. 1. In addition, a small projections or bosses 51 may be provided on front and back sides of the beam 41 upon the ribs 42 thereof and immediately below the loop 47. These projection 51 may have indented centers as indicated at 52, to further assist in gripping the anchor means 13 and adjusting the position thereof during insertion of the anchor means in the backbone of the turkey.

The retainer of the present invention is applied to or engaged with a turkey, for example, in substantially in the same manner as the retainer of my above-noted co-pending patent application. Thus, the anchor means 13 are inserted in the body cavity of an eviscerated turkey through the rear opening in the body and the pointed ends 43 of the beam 41 are slipped into the kidney holes in the backbone of the turkey. The manner of inserting these anchor beams are fully illustrated and described in my above-noted U.S. Pat. No. 4,615,075 and consequently are not further described herein, except to note that the small bosses 51 on the beam 41 may be gripped between the thumb and forefinger of a person inserting the anchor as an assistance in such insertion.

Considering the application of the present invention in the trussing of poultry legs, it is noted that following attachment of the anchor 13 to the backbone of an eviscerated turkey, the upper bridle portion 12 of the retainer is engaged with the hocks of turkey legs that are pressed tightly against the body of the turkey with the hocks extending over the rear body opening. Prior to such engagement, the tail turkey is normally swung into the rear body opening so that the legs extends thereover to retain the tail in closing relationship with the body opening. Engagement of the retainer with the turkey legs is accomplished by placing the lower strap 18 behind the underside of the turkey hocks that are held in contiguous relation to each other. The upper strap 16 is then lifted up over the top of the turkey hocks by resilient deformation of the various straps of the bridle and then lowered to resiliently engage the turkey legs immediately behind the hocks. During this operation, the pairs of straps 26 and 27 are drawn over the hocks so that they extend along the creases of the hocks. It is quite important that retainer or crease straps to lodge in the creases of the hocks so that the hocks cannot slip or move relative to each other. Inasmuch as the size of turkey hocks and turkey legs may vary considerably between different sized birds, the present inventions provides two pairs of crease or retainer straps to ensure that at least one strap is disposed in the crease of each turkey hock. Thus for some turkeys inner and outer straps 26 and 27 may be disposed in each turkey hock crease. For much smaller birds only the inner straps 26 may extend along the hocks creases and for quite large birds only the outer or secondary straps 27 may be disposed in the turkey hock crease. The present retainer does, however, provide particular means including the two pairs of retainer straps to ensure that turkeys within predetermined size limits are fully trussed by the location of a strap in each of the turkey hock creases.

With the retainer hereof attached to the turkey legs as described above the tab 31 will be seen to extend downwardly from the strap 16 behind the hocks of the turkey legs. This then prevents the legs from being moved inwardly of the body of the bird. The curved edges 32 of the tab 31 forcibly bear upon the turkey legs immediately behind the hocks so as to press through the skin of the turkey thereat and grip the legs for further preventing any possible slippage of the retained legs. This tab configuration also prohibits any vertical movement of the hocks so as to maintain same in a common horizontal alignment. The upper strap 16 is also noted to have a larger cross section than other straps of the retainer so as to be substantially rigid and this rigidity is reinforced by the tab 31 merging with the central portion of the strap. This substantially rigid upper strap 16 is advantageous in ensuring lifting of the entire top of the bridle during application of retainer to the legs of turkeys and provides a more positive engagement with the legs behind the hocks.

It is further noted with respect to the use of the present retainer that the lower strap 18 is to be placed behind the hocks to engage the underside of the legs extending from the hocks. The strap 18 is prevented from being unduly bowed outwardly during application of the retainer by the looped straps 22 and the convoluted configuration of the lower strap provides for the straps to be substantially extended so as to be capable of extending across and behind quite large turkey hocks, as well as to properly resiliently engage small turkey hocks.

With the retainer proper engaging the hocks of turkey legs all of the straps and strips of the bridle 12 are in tension and resiliently grip the turkey legs to pull the legs downwardly and inwardly of the body of the bird for firmly locking the legs in trussed position.

Removal of the retainer from trussing engagement with legs of a turkey may be accomplished by placing a finger through the upper loop 36 and drawing the bridle upwardly so that the top strap 16 may be moved over the top of the hocks to the rear of the body of the bird. The entire retainer may be pivoted rearwardly of the bird so that the legs are free to be move away from the rear body opening and the tail may be pivoted out of the opening for access to the cavity of the body as for inserting stuffing or the like. The retainer may be entirely removed from the turkey by pivoting the anchor means out of the kidney holes in the backbone of the turkey or, alternatively the retainer may be cut by scissors or knife so that the bridle portion may be removed and the anchor means left in engagement with the backbone of the turkey. One or the other of the foregoing are accomplished after the turkey has been cooked and is ready to be carved and served.

It will be seen from the foregoing the the present invention provides specific improvements over my prior poultry retainer for assisting in proper application of the retainer to the legs of turkeys of widely varying sizes. Correct application of the retainer of the turkey legs is necessary to ensure complete trussing of the legs and the present invention simplifies such application and substantially guarantees proper application of the retainer.

Although the present invention has been described above with respect to a single preferred embodiment thereof, it will be apparent to those skilled in the art that modifications and variations are possible within the scope of the present invention and thus it is not intended to limit the invention to the precise terms of description or detail of illustration.

What is claimed is:

1. An improved poultry leg retainer comprising anchor means for attachment to the body of eviscerated poultry,
   a unitary resiliently flexible bridle including upper and lower straps with interconnecting end strips for fitting over and about the hocks of poultry legs,
   said bridle having two pairs of retaining straps extending between said upper and lower straps for extension of at least one retaining strap in the crease of each leg hock, and
   legs connecting said bridle and anchor means.

2. The retainer of claim 1 further defined by a substantially rigid tab depending from the center of said upper bridle strap for disposition behind and engaging the hocks of poultry legs trussed by the retainer.

3. The retainer of claim 1 further defined by said tab having lateral sides thereof curving outwardly toward said upper strap for gripping poultry legs behind the hocks thereof.

4. The retainer of claim 1 further defined by said lower strap having a double concave central section facing said upper strap and said pairs of retaining straps joining said lower strap in said concavities.

5. The retainer of claim 1 further defined by said lower strap having upturned ends joining to said end strips and short curved straps extending from said lower strap downwardly into joinder with said end strips adjacent the top of said legs for limiting bowing of said lower strap outwardly of the plane of said retainer.

6. The retainer of claim 1 further defined by said upper strap being substantially rigid in the plane of the retainer.

7. An improved unitary poultry leg retainer for eviscerated poultry comprising,
   a bridle of resiliently flexible material and including upper and lower straps with connecting end strips for fitting behind the hocks of poultry legs,
   said bridle having a first inner pair of retaining straps extending between said upper and lower straps and a second outer pair of retaining straps extending between said upper and lower straps laterally outward of said first pair for fitting of at least one retainer strap in the crease of each hock of poultry legs being trussed despite variations in size of such hocks and legs for firmly locking the retainer on poultry legs, said bridle also having a substantially rigid tab depending from said upper strap between the retaining straps of said first pair of straps for engaging the upper or back side of the hocks of poultry legs, and anchor means adapted to engage the backbones of poultry and connected by legs to said bridle in depending relation thereto.

8. The retainer of claim 7 further defined by
said first and second pairs of retainer straps being resiliently extensible and
said second pair of retainer straps each extending from said upper strap into joinder with an adjacent strap of each first pair of retainer straps adjacent said lower strap.

* * * * *